April 16, 1968 — W. A. AYRES — 3,377,837
THERMOMETER MANUFACTURE
Filed March 14, 1966 — 3 Sheets-Sheet 1
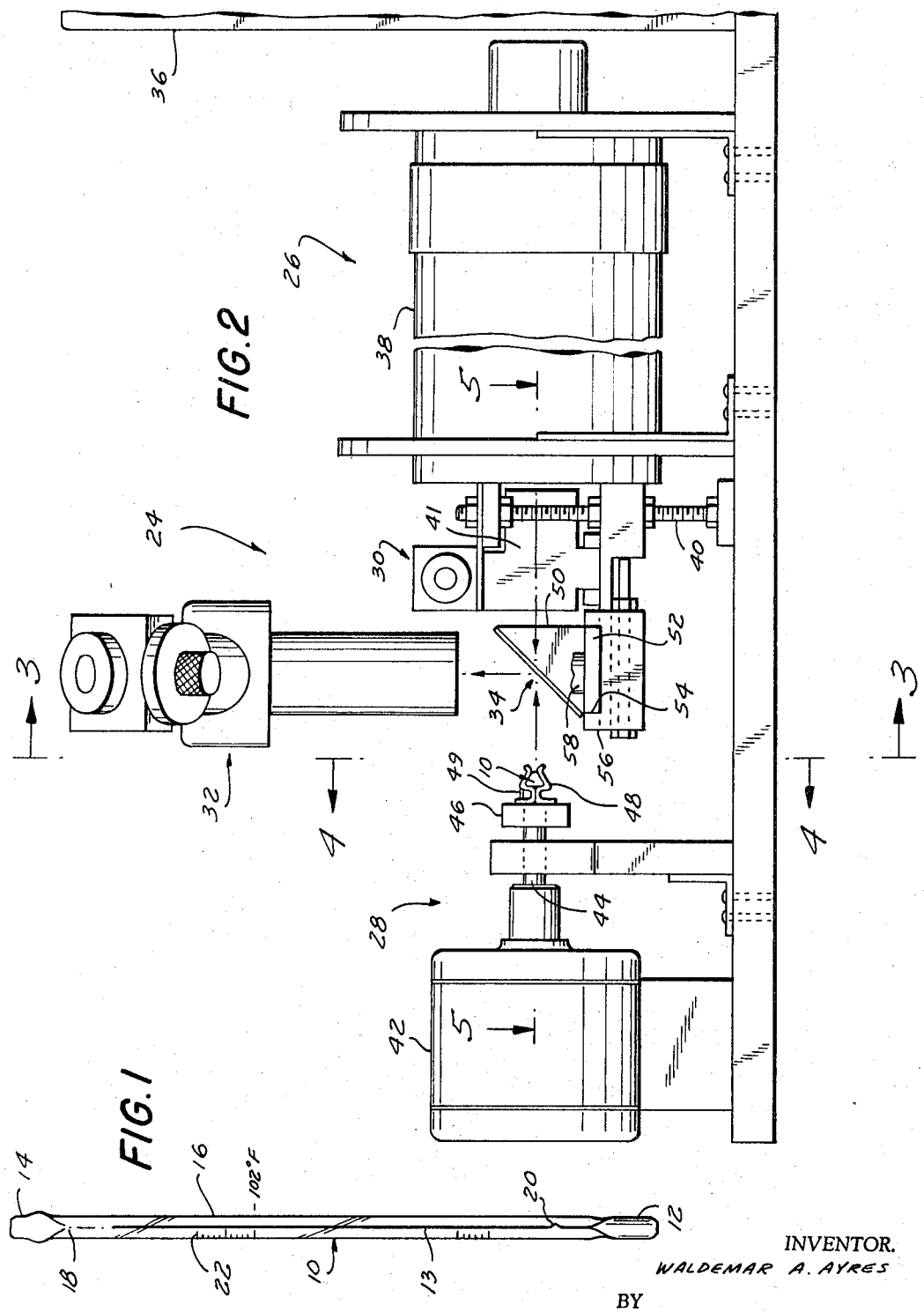
INVENTOR.
WALDEMAR A. AYRES
BY
Kane, Dalsimer, Kane & Smith
ATTORNEYS

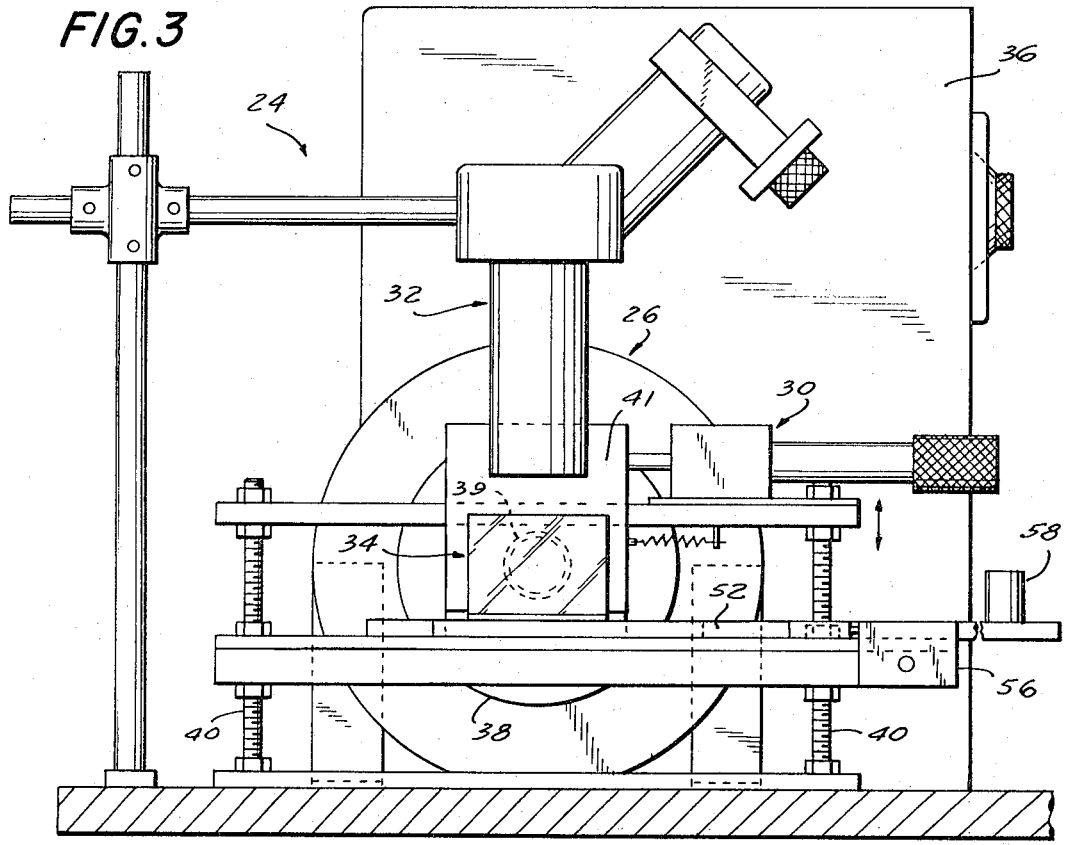
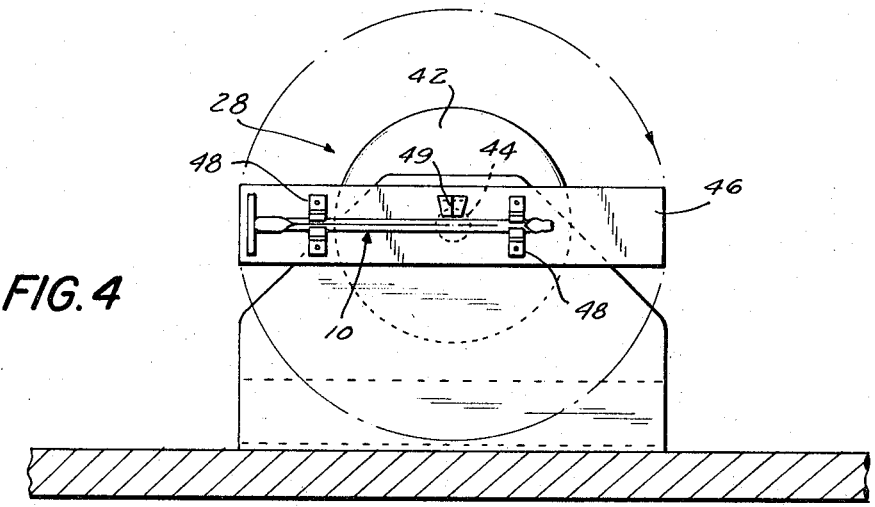

April 16, 1968     W. A. AYRES     3,377,837

THERMOMETER MANUFACTURE

Filed March 14, 1966     3 Sheets-Sheet 3

INVENTOR.
WALDEMAR A. AYRES
BY
Kane, Dalimier, Kane & Smith
ATTORNEYS

United States Patent Office 3,377,837
Patented Apr. 16, 1968

3,377,837
THERMOMETER MANUFACTURE
Waldemar A. Ayres, Rutherford, N.J., assignor to Becton Dickinson and Company, East Rutherford, N.J., a corporation of New Jersey
Filed Mar. 14, 1966, Ser. No. 539,604
14 Claims. (Cl. 73—1)

This invention relates to thermometer manufacture and, more particularly, to the splitting of the mercury column at a predetermined point during the manufacture of the thermometer whereby accurate calibration with attendant cost reduction is attained.

Heretofore, there have been many attempts to accurately break the mercury column of a thermometer, but these have been totally unsuccessful. The highly inaccurate break of the column was the major cause for such failures with the best break generally being in the order of plus or minus one-eighth of an inch. The prior art attempts employed in some instances conducted heat; a pinpoint flame or a heated wire was applied to the glass which became heated and, in turn, heated the mercury column. This conducted heat was necessarily provided by a broad, relatively unprecise, heated area or gradient. These attempts established the need for a very narrow, sharply defined heated area or steep gradient. Another disadvantage of the conducted heat approach was the driving of gas out of the glass of the thermometer stem into the capillary bore. Of course, this is detrimental and highly undesirable.

It is, therefore, a principal object of this invention to provide radiant heat particularly in the form of a laser beam to disrupt and break the mercury column of a thermometer only within the area of the narrow focused beam while heating or otherwise affecting the glass to a minimum; and immediately thereafter provide for the spinning of the thermometer about a point intermediate its ends and preferably adjacent the zone of splitting of the mercury column to thereby facilitate the removal of excess mercury from the capillary bore.

Another object is to provide for accurate splitting of the mercury column of a thermometer at a prescribed point corresponding with a particular temperature by providing a thermometer blank that is suitably marked while containing an excess amount of mercury to the extent that when the thermometer blank is heated to the particular temperature, the level of the mercury will fall between the prescribed marking of this temperature on the thermometer stem and the overflow chamber such that the excess mercury is adapted to be removed by accurately splitting the mercury column by a laser beam and thereafter spinning of the excess into the overflow chamber which is subsequently removed during the manufacturing process.

In accordance with the disclosed exemplary embodiment of this invention, a thermometer blank having a top chamber is placed in a temperature controlled water bath at a chosen temperature such as 102° F. The thermometer blank is then supported on a plate and through the use of a microscope and reflecting mirror is accurately located so that the 102° F. calibration marking on the thermometer stem is lined with the axis or path of travel of the laser beam. Following the splitting of the mercury column by the laser beam, the thermometer is spun preferably while on the mounting plate about the location of the split to thereby generate sufficient centrifugal force to drive the excess mercury up to the overflow or top chamber. Thereafter, and in accordance with conventional techniques, the top chamber with the excess amount of mercury is removed.

Other objects and advantages will become apparent from the following detailed description which is to be taken in conjunction with the accompanying drawings illustrating in somewhat diagrammatic fashion the preferred embodiment of this invention and in which:

FIG. 1 is an elevational view of a thermometer blank containing an excess amount of mercury and a top chamber with the level of the mercury shown falling short of the top chamber after the blank has been placed in a temperature controlled bath at a temperature of 102° F.;

FIG. 2 is an elevational view of the proposed apparatus for splitting the mercury column and spinning off the excess mercury and in which a laser head is arranged such that the generated beam traverses a path substantially aligned with the rotational axis of the centrifuge while the laser power supply is only fragmentarily illustrated with a microscope and sliding mirror together with an adjusting micrometer head shown between the laser head and centrifuge;

FIG. 3 is a side elevational view taken along the line 3—3 of FIG. 2;

FIG. 4 is another side elevational view taken along the line 4—4 of FIG. 2;

Figure 5:
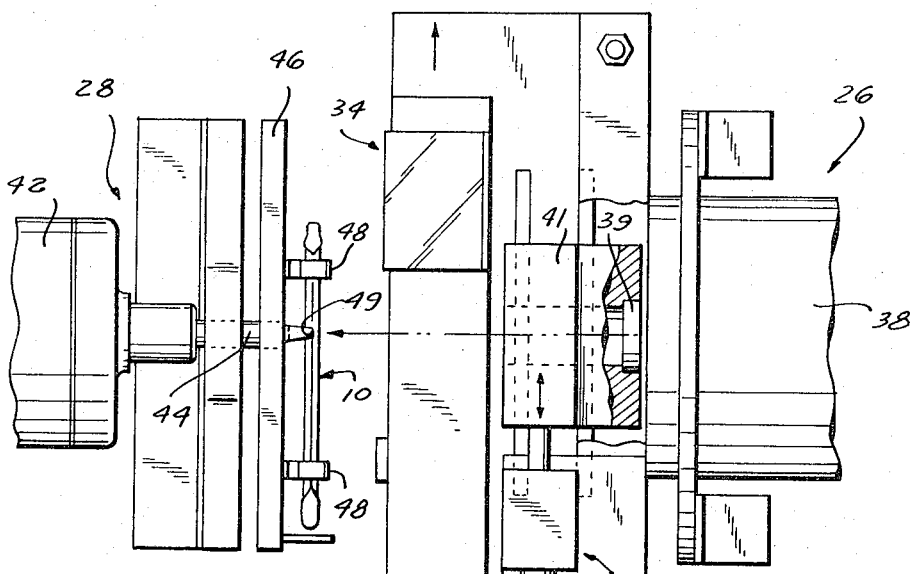
Figure 6:
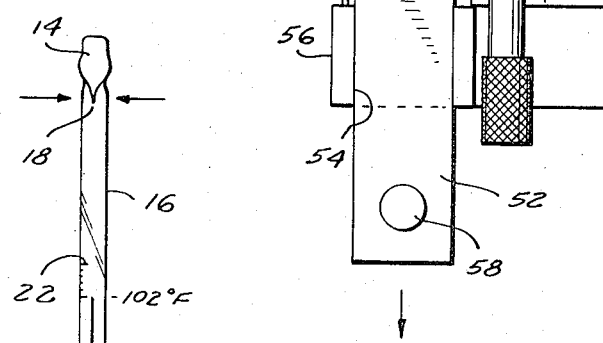

FIG. 5 is a fragmentary top plan view of the apparatus of FIG. 2 with certain parts removed for clarity illustrating the thermometer blank following the splitting of its mercury column; and FIG. 6 is an elevational view of the thermometer blank following the splitting of its mercury column showing the excess mercury driven up to the top chamber with the enlarged arrows indicating the approximate location at which the top end of the thermometer blank is removed for purposes of providing the finished and accurate thermometer.

Referring now to FIG. 1, a thermometer blank 10 is illustrated and includes a lower bulb 12 and top overflow chamber 14. For purposes of the present invention, the blank 10 is preferably heated to a prescribed temperature by means of a temperature controlled bath. The temperature of 102° F. has proven to be quite successful in furthering the invention. The thermometer blank 10 initially contains an excess amount of mercury 13 which will exceed the 102° F. mark on the thermometer stem 16 and will be disposed in the capillary 18 preferably short of the top chamber 14 but between the top and the 102° F. mark. Following the placing of the blank 10 in the temperature controlled bath, the constriction 20 will cooperate in retaining the mercury 13 in the capillary 18 without danger of the mercury retreating back to the bulb 12. As will be appreciated, the blank 10 initially has the scale 22 baked on or otherwise suitably applied to the stem 16 and over the desired length thereof. It should be understood, however, that the scale 22 may be applied at a later time; but initially the particular location at which the temperature mark of the temperature controlled bath is determined and the scale is subsequently applied following splitting of the column, spinning off the excess mercury and removal of the top chamber with the excess mercury.

Following the removal of the thermometer blank 10 from the controlled temperature bath, the blank 10 is positioned in the splitting and spinning apparatus 24 comprised essentially of a laser unit 26, spinning unit 28, an interposed micrometer 30, microscope 32, and sliding mirror 34. The laser unit 26 is essentially a pulsed ruby system and may be obtained commercially under the name TRG Model 104 Laser System and which is described in the Handbook of Instructions for Model 104 Laser System supplied by the manufacturer, TRG Incorporated, Melville, N.Y. A system of this type will include a power supply 36 and laser head or gun 38. A focusing lens 39 is to be provided at the discharge end of the laser head 38 to obtain the necessary degree of fineness and sharpness of the laser beam. A microscope single element lens having 36 mm. focal length has been used successfully for the focusing lens 39. For details of construction and operation of the laser unit 26, reference is made to the operating manual supplied by the manufacturer for the TRG Model 104 Laser System. In addition, a number of publications and texts are now available which adequately describe the basic theory of lasers. Suffice it to say, the laser gun 38 is suitably mounted so that it is adjustable to assure a predetermined path of travel of the generated laser beam. Towards this end, the screw adjusting means 40 provides for vertical adjustment of the beam axis of the laser gun 38 while the micrometer 30 provides for accurate horizontal adjustment of the focusing lens 39 and consequently the beam axis to within 0.001 inch. The lens 39 is suitably supported by a block 41 slidable between guides in a horizontal direction by the micrometer 30 under the influence of the illustrated spring biasing means. As shown, this block is movable vertically with the laser gun 38.

The thermometer spinning unit 28 is adapted to be periodically actuated to spin the thermometer blank 10 following the splitting of its mercury column 13 for purposes of subjecting the excess mercury within the capillary 18 to centrifugal force of a sufficient magnitude to drive the excess into the top chamber 14. Towards this end, the spinning unit 28 includes a suitably bracketed and supported motor 42 having a suitably journaled output shaft 44 disposed essentially in a horizontal plane such that the axis of rotation of the shaft coincides substantially with the path of travel of the laser beam. The end of the shaft 44 conveniently receives plate 46 for mounting the thermometer blank 10. The plate 46 includes clamping means or any other structure adapted to releasably hold or retain the thermometer. At the same time, this clamping means 48 is adapted to permit relative movement of the thermometer 10 relative to the plate in order to align the location at which the splitting is to take place, notably, the 102° F. graduation with the path of travel of the laser beam. Towards this end, a hair line 49 is mounted as part of plate 46 in registry with the laser beam axis. The mercury 13 and the hair line can both be readily viewed in the microscope 32. Where desired or necessary, the plate 46 may be provided with an end abutment or stop for eventually receivin the bulb end of the thermometer 10 during centrifugation to prevent the thermometer from accidentally being thrown from the plate 46. During the actual beam splitting process, the plate 46 preferably holds the thermometer blank 10 in a substantially horizontal position.

A conventional type of microscope 32 suspended between the laser unit 26 and spinning unit 28 is adapted to cooperate with the sliding mirror 34 to observe the scale or other markings on the thermometer 10 to assure its proper positioning on the plate 46 relative to the laser beam axis. With this in mind, the mirror 34 is mounted at a substantially 45° angle relative to the axis of rotation of the shaft 44 and the substantially vertically disposed optical axis of the microscope 32. This support is by means of a bracket 50 projecting upwardly from the slidable plate 52. The plate is adapted to travel in a track 54 and slidably on the substantially horizontally disposed plate 56. In this manner, the mirror 34 is adapted to be slid by merely grasping the handle 58 on the mirror bracket support plate 52 and moved out of alignment with the path of travel of the laser beam. When it is desired to position the thermometer blank 10 on the plate 46 or view the split in the mercury column 13, the mirror 34 is slid back to a position at which it is aligned with the path of travel of the laser beam. A suitable stop may be employed for determining this position.

By simply viewing the hair line 49 through the microscope 32, the thermometer 10 also under observation while on the plate 46 is adapted to be shifted to align the selected graduation with the hairline 49 and consequently with the path of travel of the laser beam. After the thermometer blank 10 has been properly positioned on the plate 46 so that the selected graduation is aligned with the path of travel of the laser beam by means of a hairline 49, the mirror 34 is shifted clear of the laser beam to be transmitted. The laser gun 38 is actuated to generate a pulse of high intensity light energy which passes through the glass of the stem 16 without injuring the glass and impinges upon the mercury column 13 to split it at the 102° F. graduation. Following this, the mirror 34 may be shifted back to a position at which the thermometer blank 10 may be viewed through the microscope 32 to observe the adequacy and quality of the split in the mercury column. Assuming that the split is satisfactory or that it need not be observed for one reason or another, the spinning unit 28 is actuated to spin the plate 46 and consequently the thermometer blank 10 with the split mercury column. The speed of the unit 28 is selected such that sufficient centrifugal force is generated to cause the excess mercury above the split to be driven into the top chamber 14. The spinning unit 28 is then stopped and the thermometer blank 10 is removed from the plate 46. Now the excess mercury in the top chamber 14 need only be removed by removing the top chamber and the contained mercury from the thermometer stem 16 at a location schematically indicated in FIG. 6 according to conventional techniques to thereby produce a finished and completely accurate clinical thermometer.

The laser beam pulse duration is ordinarily in the order of a few milliseconds. Pulses of 1 millisecond and less generated by selected commercially available equipment have produced satisfactory results. The intensity of the laser beam and the output of the laser gun 38 should be such that sufficient energy is available to cause the mercury column to split where desired, the split being in the order of up to an eighth to a quarter of an inch depending upon the intensity of the beam.

However, the intensity should not be too great otherwise shattering of the thermometer glass will occur, a phenomenon readily observable through the microscope and mirror assembly; or multiple splits of the mercury column may be produced which is unacceptable because of the difficulty in assuring proper separation of the excess mercury into the top chamber 14 during spinning.

In those cases where the thermometer blank 10 is not initially pointed and a scale 22 suitably applied thereon, the present invention contemplates initially running the mercury column in the bulb up through the capillary 18 by placing the thermometer blank 10 in a temperature controlled bath at a predetermined temperature as, for example, 98° F. A location on the thermometer stem 16 is selected at which the 98° F. mark is to be located. At this point, the mercury column is split and the excess mercury driven up to the top chamber. The thermometer is then placed in a second temperature controlled bath as, for example, at 106° F. and the level of the mercury in the capillary bore 18 as a result of this temperature is marked. A scale is then selected which matches these two points and is then imprinted by one of a number of techniques and procedures on the thermometer stem 16.

The laser beam can be readily focused to a diameter or a line width of a few thousandths of an inch, or less, where it falls on the mercury column. The disruption of the mercury will be within the cross-section of the beam focused thereon, since the glass will be cool instead of hot. Therefore, the present invention obtains an accuracy of splitting the mercury column within a few thousandths of an inch.

The placement of the mercury column in a substantially horizontal position during the splitting operation removes the effective gravity on the mercury column 14 acting in a direction coincident with the axis of the capillary bore. In this manner, the surface tension of the liquid will be such that the liquid will not have a tendency to drop below the selected location or point at which the mercury column is split by the laser beam.

In view of the relatively small split in the mercury column contemplated by the present invention, it is desirable to spin the thermometer immediately following the splitting operation. It has been found that in time or with slight agitation the split column will eventually come together. Thus, by using a common support for the splitting and spinning operations, danger of the mercury column coming together inadvertently is eliminated.

Thus, the several aforenoted objects and advantages are most effectively attained. Although a single somewhat preferred embodiment of the invention has been disclosed and described in detail herein, it should be understood that this invention is in no sense limted thereby and its scope is to be determined by that of the appended claims.

I claim:

1. A apparatus for splitting the mercury column of a clinical thermometer at a selected location comprising:
   a support for maintaining in a predetermined position a thermometer blank having a column of mercury extending beyond the said selected position;
   a laser unit supported in a predetermined position whereby it is adapted to direct a laser beam of predetermined intensity and duration along a predetermined path of travel to impinge upon the mercury column of the thermometer blank at the selected location to split the mercury column at such location;
   and spinning means for spinning the thermometer blank substantially about said location to generate sufficient centrifugal force to increase the amount of separation of the mercury column to thereby facilitate removal of excess mercury in the column at one side of the said location.

2. The invention in accordance with claim 1 wherein said support includes a plate and clamping means on said plate for adjustably clamping the thermometer blank thereon such that the blank may be shifted to align said selected location on the blank with the predetermined path of travel of said laser beam.

3. The invention in accordance with claim 1 wherein a micrometer adjustment means is associated with said laser unit for accurately adjusting and locating the path of travel of the laser beam.

4. The invention in accordance with claim 1 wherein said spinning means includes a motor having an output shaft and means for coupling the support for the thermometer blank to the output shaft of the motor.

5. The invention in accordance with claim 4 wherein the axis of rotation of said spinning means is substantially aligned with the path of travel of said laser beam.

6. The invention in accordance with claim 5 wherein a hair line means is associated with said spinning means for precisely locating the thermometer blank relative to the axis of the laser beam.

7. The invention in accordance with claim 1 wherein a shiftable mirror is interposed between the support and laser unit and is shiftable from a first position extending across the path of travel of said laser beam and at which the marking of the thermometer blank and column of mercury is adapted to be viewed to a second position beyond the path of travel of the laser beam.

8. The invention in accordance with claim 7 wherein a microscope is operatively associated with said mirror whereby the marking on the thermometer blank and mercury column is adapted to be viewed by reflectance off of the mirror when the mirror is in said first position such that the thermometer blank is adapted to be accurately positioned on the support to align the selected location at which the mercury column of the thermometer is adapted to be split with the path of travel of the laser beam and also to determine whether the mercury column has been properly split by the laser beam.

9. An apparatus for splitting the liquid column of a thermometer at a selected location comprising:
   a laser unit adapted to direct a laser beam along a predetermined path of travel, means for positioning a thermometer so that the selected location is in the path of travel of the laser beam;
   and spinning means for spinning the thermometer substantially about said location to preserve the selected amount of liquid in the thermometer.

10. A method of splitting the mercury column of a clinical thermometer at a selected location comprising:
    supporting in a predetermined position a marked thermometer blank having a column of mercury extending beyond the said selected position with the mercury having been heated to a predetermined temperature which is to correspond with the selected location;
    directing a laser beam of predetermined intensity and duration along a predetermined path of travel so that the beam impinges upon the mercury column of the thermometer blank at the selected location to split the mercury column at such location;
    and spinning the thermometer blank substantially about said location to generate sufficient centrifugal force to increase the amount of separation of the mercury column to thereby facilitate removal of excess mercury from the column at one side of said location.

11. The invention in accordance with claim 10 wherein the thermometer blank includes a mercury reservoir at one end and an overflow chamber at the other end and an amount of mercury sufficient to extend between the selected location and the overflow chamber when the thermometer blank and contained mercury is heated to the predetermined temperature corresponding to said selected location.

12. The invention in accordance with claim 10 wherein a reflecting mirror is slid between a first position substantially aligned with the path of travel of the laser beam and at which the selected location on the thermometer blank is adapted to be viewed so that said selected location is adapted to be visually aligned with said path of travel of the laser beam and a second position at which the mirror is beyond the path of travel of the laser beam.

13. The invention in accordance with claim 12 wherein, following the splitting of the mercury column, the mirror is slid back to said first position and then observing the split of the mercury column for assuring proper splitting thereof.

14. The invention in accordance with claim 10 wherein the spinning of the thermometer blank having the split mercury colum is performed immediately following splitting of the mercury column by the laser beam and while the selected location is retained in alignment with the path of travel of the laser beam by aligning the axis of spin of the thermometer also with the path of travel of the laser beam.

References Cited

UNITED STATES PATENTS

| | | | |
|---|---|---|---|
| 2,931,735 | 4/1960 | Richards | 73—1 X |
| 3,316,076 | 4/1967 | Blackman | 73—1 X |

LOUIS R. PRINCE, *Primary Examiner.*

S. CLEMENT SWISHER, *Examiner.*